United States Patent
Gebhardt

(10) Patent No.: US 7,921,882 B2
(45) Date of Patent: Apr. 12, 2011

(54) FEED LINE FOR A HYDRAULIC SYSTEM AND HYDRAULIC SYSTEM

(75) Inventor: Rainer Gebhardt, Weinstadt (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 314 days.

(21) Appl. No.: 12/170,698

(22) Filed: Jul. 10, 2008

(65) Prior Publication Data

US 2009/0025384 A1    Jan. 29, 2009

(30) Foreign Application Priority Data

Jul. 27, 2007  (DE) .......................... 10 2007 035 350

(51) Int. Cl.
*F16L 55/04* (2006.01)
(52) U.S. Cl. ............................................ 138/30; 138/26
(58) Field of Classification Search ............... 138/26, 138/30
See application file for complete search history.

(56) References Cited

U.S. PATENT DOCUMENTS

| | | | |
|---|---|---|---|
| 3,580,289 A | | 5/1971 | James, Jr. et al. |
| 3,665,967 A | * | 5/1972 | Kachnik ........................ 138/137 |
| 3,878,867 A | * | 4/1975 | Dirks ............................ 138/30 |
| 4,125,726 A | * | 11/1978 | Walser et al. .................. 540/562 |
| 4,794,955 A | * | 1/1989 | Ejima et al. ..................... 138/30 |
| 6,125,890 A | | 10/2000 | Cooper et al. |
| 6,948,479 B1 | * | 9/2005 | Raney et al. .................. 123/456 |

FOREIGN PATENT DOCUMENTS

| | | |
|---|---|---|
| DE | 1704937 A | 6/1971 |
| DE | 8313519 U1 | 2/1984 |
| DE | 3809310 A1 | 10/1988 |
| DE | 69109428 T2 | 1/1996 |
| DE | 69111443 T2 | 1/1996 |
| DE | 10334369 B3 | 7/2005 |
| DE | 102004036030 A1 | 2/2006 |
| DE | 69733949 T2 | 5/2006 |
| EP | 0478249 B1 | 5/1995 |
| WO | 9118050 A1 | 11/1991 |

OTHER PUBLICATIONS

Deutsches Patent-Und Markenamt, Recherchebericht, May 13, 2008, 4 pages, Munich.

* cited by examiner

*Primary Examiner* — Patrick F Brinson

(57) ABSTRACT

The feed line for a hydraulic system, in particular of a motor vehicle, is formed, at least over part of its longitudinal extent, by a dimensionally variable body. The wall of the dimensionally variable body is elastically deformable, at least in regions, so that, when the flow passes through the dimensionally variable body, the cross section of the dimensionally variable body can be varied as a function of the pressure of the hydraulic medium.

18 Claims, 3 Drawing Sheets

US 7,921,882 B2

FEED LINE FOR A HYDRAULIC SYSTEM AND HYDRAULIC SYSTEM

CROSS-REFERENCE TO RELATED APPLICATION

This application claims the priority, under 35 U.S.C. §119, of German patent application DE 10 2007 035 350.4, filed Jul. 27, 2007; the prior application is herewith incorporated by reference in its entirety.

BACKGROUND OF THE INVENTION

Field of the Invention

The invention relates to a feed line for a hydraulic system, in particular of a motor vehicle, such as, for example, a power steering system. The invention also pertains to a hydraulic system provided with such a feed line, in particular a hydraulic system for a motor vehicle.

It is known that, under unfavorable conditions, in hydraulic systems the hydrostatic pressure of the hydraulic medium may locally undershoot the vapor pressure of the hydraulic medium at the prevailing temperature, thus often leading to cavitation phenomena or at least to disturbing noises. In specific driving situations, for example when the steering wheel is quickly shifted to the steering stops during parking, the risk of the occurrence of cavitation is increased, because the pressure in the hydraulic steering system of the vehicle abruptly changes locally on account of the stress on the vehicle wheels which is caused by the forces.

SUMMARY OF THE INVENTION

It is accordingly an object of the invention to provide a hydraulic feed line and a corresponding hydraulic system which overcome the above-mentioned disadvantages of the heretofore-known devices and methods of this general type and which safely prevent cavitation from occurring.

With the foregoing and other objects in view there is provided, in accordance with the invention, a feed line for a hydraulic system, in particular in a motor vehicle. The hydraulic feed line comprises:

a dimensionally variable body forming the feed line, at least over a part of a longitudinal extent thereof, the dimensionally variable body having an elastically deformable body wall, at least in regions thereof;

wherein, when hydraulic medium flow passes through the dimensionally variable body, a cross section of the dimensionally variable body is varied as a function of a pressure of the hydraulic medium.

In other words, the objects of the invention are achieved in that the feed line is formed, at least over part of its length, by a dimensionally variable body, the body wall of which is elastically deformable, at least in regions. When the hydraulic medium passes through the dimensionally variable body, the cross section of the dimensionally variable body can be varied as a function of the pressure of the hydraulic medium.

The dimensionally variable body may basically be configured as desired, and may be configured, for example, as a flexible, elastically deformable hose body.

In one embodiment of the invention, the dimensionally variable body is surrounded by an outer body.

In a preferred embodiment of the invention, the outer body may basically be formed as desired, for example as an outer hose.

According to a refinement of the invention, the hose body is produced from a comparatively easily expandable material, while the outer body is produced from an only slightly expandable or non-expandable material. The outer body can consequently offer counter-forces to the pressure forces exerted on the inside of the outer body by the expandable hose body and can absorb higher pressure forces, as compared with the hose body.

According to a refinement of the invention, in the position of rest, that is to say without the action of pressure by the hydraulic medium (i.e., substantial pressure equilibrium between the exterior pressure and the pressure of the hydraulic medium), the hose body has, at least over part of its longitudinal extent, an initial cross section of flat shape and/or of approximately oval shape. The flat or oval shape approaches a circular shape during the expansion of the hose body as a result of the increasing action of pressure by the hydraulic medium flowing through the hose body. The term "flat" means in this text that the cross section has an extent appreciably lower (for example, by the factor two) in one direction of space running perpendicularly with respect to the axial direction of the hose body than in the other direction of space running perpendicularly with respect to the axial direction of the hose body.

Advantageously, the hose body may have, at least over part of its length, a substantially wavy or wave-shaped cross section, that is an axial corrugation. In another embodiment of the invention, the hose body has, at least over part of its longitudinal extent, an substantially star-shaped cross section.

Basically any other suitable shapes may, of course, also be considered for the cross-sectional shape of the hose body.

For example, the hose body is produced from a material which comprises rubber. If the hose body is of multilayer form, at least one layer of the hose body is produced from a material which comprises rubber.

For example, the outer hose is produced from a material which comprises an elastomer. If the outer hose is of multilayer form, at least one layer of the outer hose is produced from a material which comprises an elastomer. For example, the elastomer referred to comprises chlorosulfonated polyethylene (CSM).

Other features which are considered as characteristic for the invention are set forth in the appended claims.

Although the invention is illustrated and described herein as embodied in feed line for a hydraulic system and hydraulic system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
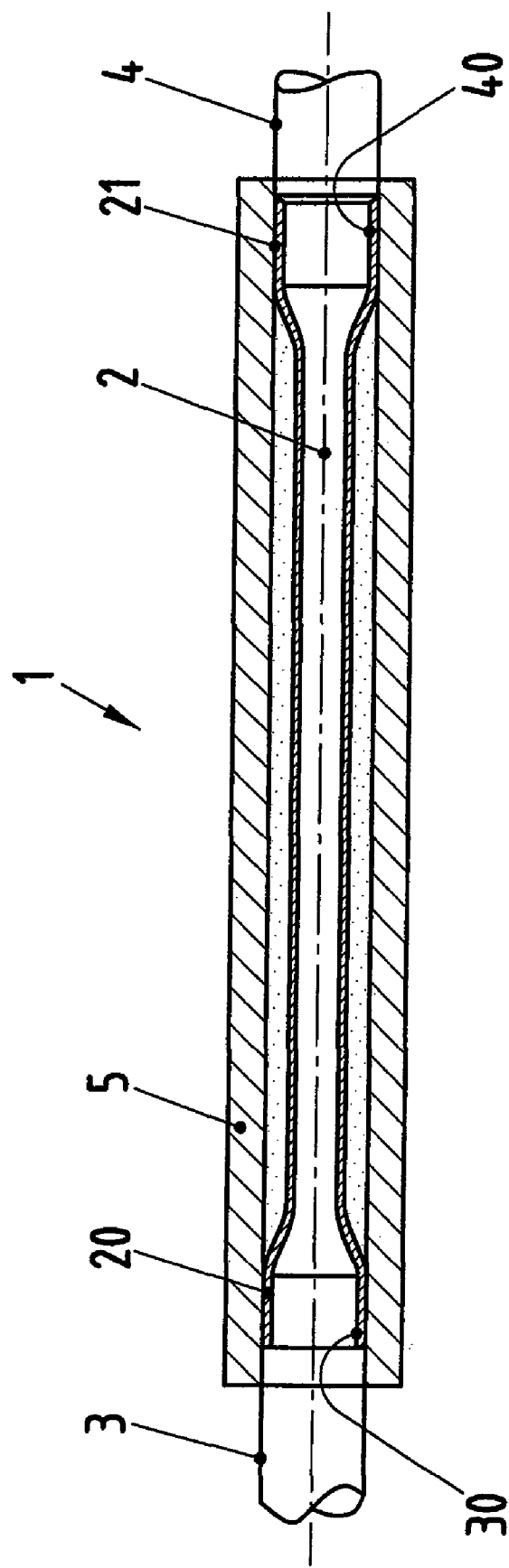
FIG. 1 is a diagrammatic longitudinal section through a portion of a feed line according to the invention.

Referring now to the figures of the drawing in detail and first, particularly, to FIG. 1 thereof, the diagrammatic illustration shows a section along the longitudinal direction of a feed line 1 according to the invention. The feed line 1 is an integral part of a hydraulic system with a hydraulic volume as an accumulator. A hose body 2 of a first exemplary embodiment (designated below briefly as a "first hose body") is integrated, pressure-tight, into the feed line 1. In the position of rest, the first hose body 2 possesses an oval cross-sectional shape. The first hose body 2 is formed from a flexible, elastically deformable material, extends between a first rigid feed line tube 3 (illustrated only partially) and a second rigid feed line tube 4 (likewise illustrated only partially). It is fluidically connected between the two feed line tubes 3, 4. The feed line tubes 3, 4 have in each case a circular cross section.

The hose body is surrounded by an outer hose 5 of circular cross section. The gap formed between the first hose body and the outer hose is filled with air.

The two feed line tubes 3, 4 are provided, at their ends that are disposed inside the outer hose 5 and facing one another, with a first connection part 30 and with a second connection part 40, respectively. The two connection parts 30, 40 are in each case of hollow-cylindrical design. The first hose body 2, with its first longitudinal end 20, sealingly surrounds the outer circumference of the first connection part 30. Correspondingly, the first hose body 2, with its second longitudinal end 21, sealingly surrounds the outer circumference of the second connection part 40.

The first hose body 2 is deformed under the influence of the hydrostatic pressure of the hydraulic medium flowing through the first hose body 2. In this case, with an increasing pressure, the first hose body 2 expands in the radial direction from an initial shape, which the first hose body 2 assumes in the position of repose, and thus experiences an increase in volume. When the pressure in the hydraulic system falls again, the first hose body 2 contracts and endeavors to resume its original initial shape. During the contraction of the first hose body 2, hydraulic medium is discharged out of the first hose body 2 into the feed line tubes 3, 4, with the result that the undershooting of the vapor pressure in the feed line tubes 3, 4 is counteracted. To some extent, the first hose body 2 forms an accumulator for a compensating quantity of hydraulic medium for the compensation of pressure fluctuations in the hydraulic system.

A flexible, elastically deformable hose body 2 and a functionally appropriate volume adaptation of the hose body 2 may also be provided in that a twist angle deviating from what is known as the neutral angle is selected for the hose body 2. The neutral angle amounts to approximately 54.7° for the twist angle. The neutral angle is characterized by a force equilibrium between axial and tangential forces. The twist angle designates the angle between the longitudinal axis of the hose body 2 and the individual fibers of the braiding. A functionally appropriate volume flexibility of the hose body 2 arises in the case of a twist angle of between preferably approximately 38° and 48°. The twist angle may amount, for example, to approximately 43°.

The outer hose 5 disposed coaxially with the two feed line tubes 3, 4 and with the hose body 2 has a higher pressure loadability and a higher rigidity, as compared with the first hose body 2. The outer hose 5 can consequently offer counterforces to the radial pressure forces exerted by the expanding hose body on the cylindrical inner wall of the outer body and can absorb higher pressure forces, as compared with the hose body 2.

Figure 2:
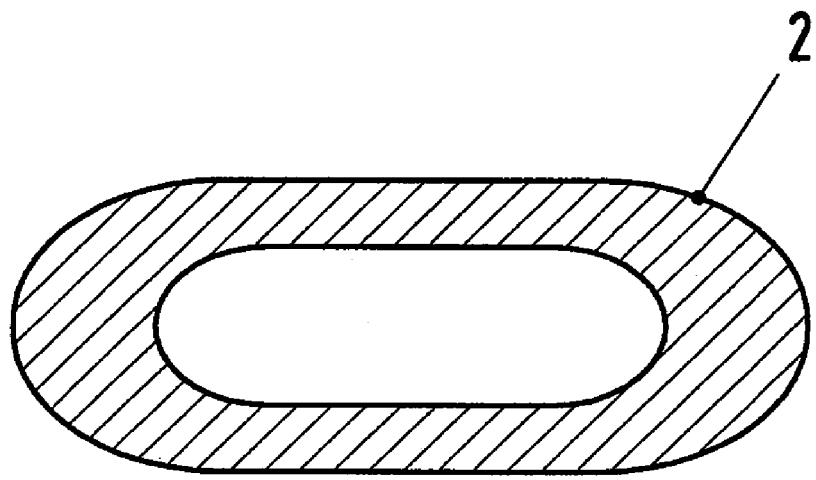
FIG. 2 is a diagrammatic cross section taken through the hose body of the structure of FIG. 1 in the position of rest.

FIG. 2 shows a cross section of the first hose body 2 in the position of rest. In the position of rest, the cross section of the first hose body 2 has an oval shape which, as compared with a round cross-sectional shape in the position of rest, gives the hose body 2 particularly more advantageous elastic properties which are effected, for example, in high flexibility during the contraction of the hose body.

Figure 3:
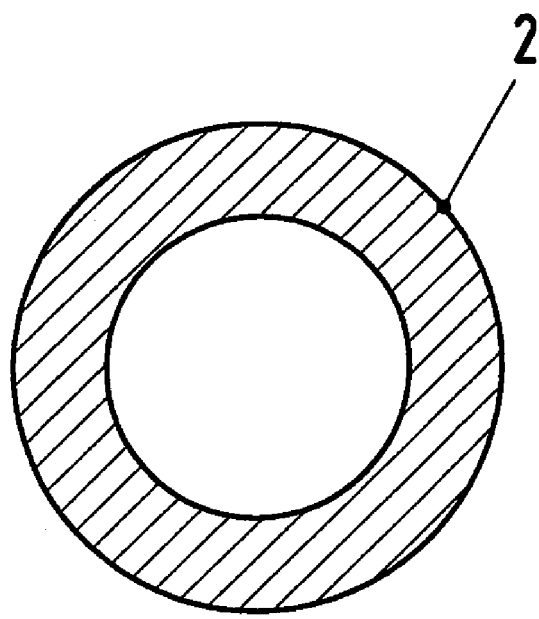
FIG. 3 is a similar view of the hose body of FIG. 2 in the pressure-loaded, expanded state.

FIG. 3 shows a cross section of the first hose body 2 in the expanded state. The cross section then has an approximately circular shape.

Figure 4:
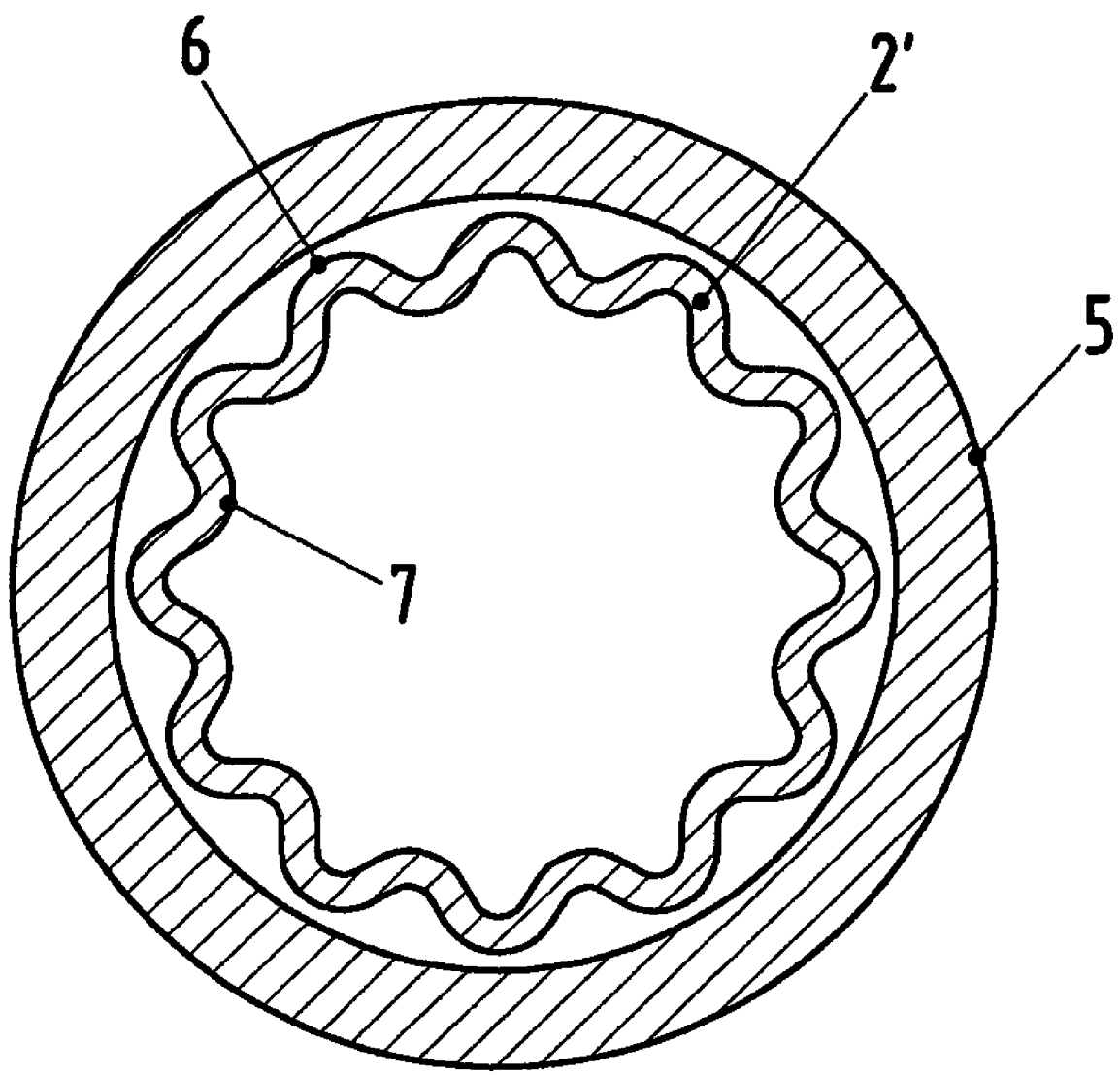
FIG. 4 is a cross section through a hose body of star-shaped cross section surrounded by an outer hose.

FIG. 4 shows a cross section through a second hose body 2' and an outer hose 5 surrounding the latter. The second hose body 2' has a wavy (undulating, corrugated) cross section similar to an accordion bellows shape which gives the second hose body 2' particularly advantageous elastic properties, such as, for example, the ability, even under comparatively low pressures, to react with a relatively high expansion. The longitudinal elevations 6, in each case arranged, offset to one another, circularly at the same angle, extend in the radial direction outward from the core part 7 and in the axial direction, parallel to one another, over the entire longitudinal extent of the second hose body 2'. The core part 7, having an annular cross section, is delimited inwardly by a cylindrical inner face. The second hose body 2' may also have a star-shaped cross section.

The design variances of the hose body 2 or 2' which are shown in FIGS. 1 to 4 are suitable both for use in conjunction with an outer hose, that is to say in a so-called hose-in-hose variant, and for use as a shaped hose without a corresponding further hose, for example outer hose 5.

The invention claimed is:

1. A feed line for a hydraulic system, comprising:
   a dimensionally variable body forming the feed line, at least over a part of a longitudinal extent thereof, said dimensionally variable body having an elastically deformable body wall, at least in regions thereof, and a twist angle deviating from a neutral angle being 54.7°; and
   wherein, when hydraulic medium flow passes through said dimensionally variable body, a cross section of said dimensionally variable body is varied as a function of a pressure of the hydraulic medium.

2. The feed line according to claim 1, wherein the feed line is integrated in a hydraulic system of a motor vehicle.

3. The feed line according to claim 1, wherein said dimensionally variable body is a flexible, elastically deformable hose body.

4. The feed line according to claim 1, which comprises an outer body surrounding said dimensionally variable body.

5. The feed line according to claim 3, wherein said outer body is an outer hose.

6. The feed line according to claim 3, wherein said hose body is formed of a comparatively easily expandable material and said outer body is formed of less expandable or nonexpendable material.

7. The feed line according to claim 3, wherein, in a position of rest, said hose body has, at least over part of the longitudinal extent thereof, a substantially flat or substantially oval-shaped initial cross section, and the cross section approaches a circular shape during an expansion of the hose body in response to increasing pressure acting upon the hose body.

8. The feed line according to claim 3, wherein said hose body has a substantially wavy cross section, at least over part of the longitudinal extent thereof.

9. The feed line according to claim 3, wherein said hose body has a substantially star-shaped cross section, at least over part of the longitudinal extent thereof.

10. The feed line according to claim 3, wherein said hose body is formed of a material that comprises rubber.

11. The feed line according to claim 3, wherein at least one layer of said hose body is formed of a material that comprises rubber.

12. The feed line according to claim 5, wherein said outer hose is formed of a material that comprises an elastomer.

13. The feed line according to claim 12, wherein said elastomer comprises chlorosulfonated polyethylene.

14. The feed line according to claim 5, wherein at least one layer of said outer hose is formed of a material that comprises an elastomer.

15. The feed line according to claim 14, wherein said elastomer comprises chlorosulfonated polyethylene.

16. A hydraulic system, comprising a feed line according to claim 1.

17. In a motor vehicle, a hydraulic system comprising at least one feed line according to claim 1.

18. The feed line according to claim 1, wherein said twist angle is between 38° and 48°.

* * * * *